United States Patent

Haraldsson et al.

Patent Number: 5,865,102
Date of Patent: Feb. 2, 1999

[54] DEEP-FRYING APPARATUS

[75] Inventors: Roland Haraldsson, bromölla; Jan Bengtsson, Hässleholm, both of Sweden

[73] Assignee: Potato Processing Machinery AB, Kristianstad, Sweden

[21] Appl. No.: 952,679
[22] PCT Filed: May 15, 1996
[86] PCT No.: PCT/SE96/00635
   § 371 Date: Nov. 14, 1997
   § 102(e) Date: Nov. 14, 1997
[87] PCT Pub. No.: WO96/36266
   PCT Pub. Date: Nov. 21, 1996

[30] Foreign Application Priority Data

May 17, 1995 [SE] Sweden .................................. 9501825

[51] Int. Cl.⁶ .............................. A23L 1/01; A23L 1/217; A47J 37/12
[52] U.S. Cl. ............................. 99/408; 99/330; 99/403; 210/167; 210/DIG. 8
[58] Field of Search ........................ 99/330, 331, 339, 99/403–407, 408, 410; 426/438, 490, 492; 210/167, 232, 416.1, 482, DIG. 8

[56] References Cited

U.S. PATENT DOCUMENTS

| | | | |
|---|---|---|---|
| 3,701,313 | 10/1972 | Boggs ........................................ | 99/330 |
| 4,210,123 | 7/1980 | Moore et al. ............................. | 126/374 |
| 4,324,173 | 4/1982 | Moore et al. ............................. | 99/331 |
| 4,738,193 | 4/1988 | Benson et al. ............................ | 99/404 |
| 4,942,808 | 7/1990 | Benson et al. .......................... | 99/339 X |
| 5,137,740 | 8/1992 | Benson et al. .......................... | 426/438 |
| 5,167,979 | 12/1992 | Benson et al. .......................... | 426/438 |
| 5,249,511 | 10/1993 | Shumate et al. .......................... | 99/408 |
| 5,297,474 | 3/1994 | Tabuchi ................................. | 99/403 X |
| 5,570,626 | 11/1996 | Vos ......................................... | 99/404 |

FOREIGN PATENT DOCUMENTS

| | | |
|---|---|---|
| 0 273 094 | 7/1988 | European Pat. Off. . |
| 30 02 610 | 8/1980 | Germany . |
| 43 42 727 | 4/1995 | Germany . |
| 464 611 | 5/1991 | Sweden . |

*Primary Examiner*—Timothy F. Simone
*Attorney, Agent, or Firm*—Browdy and Neimark

[57] ABSTRACT

A deep-frying apparatus comprises an elongate deep-frying pan (1) having a plurality of bottom inlets (2–6) and bottom outlets (7–9) for frying oil, as well as a filter (13), a circulation pump (14) and a heat exchanger (11), which are connected in series from a first collection pipe (12), which is connected to the bottom outlets (7–9), to a second collection pipe (10), which is connected to the bottom inlets (2–6). At least one pair (18–20) of opposing lateral inlets is arranged in opposing side walls of the deep-frying pan (1) and provided opposite to one another in an area closest to an inlet end (16). At least two of the bottom inlets (2–6) are arranged in this area. Via a third collection pipe (24), the lateral inlets (18–20) are connected to the circulation pump (14), such that oil jets having a velocity of flow much exceeding that of the frying oil flowing in the longitudinal direction of the deep-frying pan are directed towards one another essentially transversely of this longitudinal direction.

10 Claims, 1 Drawing Sheet

DEEP-FRYING APPARATUS

BACKGROUND OF THE INVENTION

1. Technical Field of the Invention

This invention concerns a deep-frying apparatus for such products as may easily adhere to one another when fried, primarily potato products, such as crisps.

2. Prior Art

A known deep-frying apparatus intended for this purpose comprises an elongate deep-frying pan having a plurality of bottom inlets and bottom outlets for the frying oil. Each of the bottom inlets and outlets extends essentially over the entire width of the deep-frying pan. The inlets and outlets are distributed along the length of the deep-frying pan in order to cause the frying oil to flow in the longitudinal direction of the deep-frying pan, from an inlet end towards an outlet end for the products to be fried.

The deep-frying apparatus further comprises a filter, a circulation pump and a heat exchanger, which are connected in series from a first collection pipe, which is connected to the bottom outlets, to a second collection pipe, which is connected to the bottom inlets.

If this deep-frying apparatus is used for frying e.g. thin potato slices immediately after these have been produced by the slicing of potato, especially unpeeled and unwashed potato, the potato slices will to a large extent stick together. In small-scale production, this may largely be prevented by manual agitation of the frying oil in which the potato slices are immersed. In large-scale production, however, it has previously been necessary to pretreat the newly-cut potato slices by e.g. rinsing them in water and then optionally drying them, before the thus-treated potato slices may be deep-fried with any success, i.e. without sticking together.

OBJECT AND SUMMARY OF THE INVENTION

The object of this invention is to provide a deep-frying apparatus enabling in particular potato slices to be deep-fried immediately after production.

According to the invention, at least one pair of opposing lateral inlets should be arranged in opposing side walls of the deep-frying pan and be provided opposite to one another in an area closest to the inlet end, at least two of the bottom inlets being arranged in this area. Via a third collection pipe, the lateral inlets should be connected to the circulation pump, such that oil jets having a velocity of flow much exceeding that of the frying oil flowing in the longitudinal direction of the deep-frying pan are directed against one another essentially transversely of said longitudinal direction. This enables a turbulent frying-oil flow, which is essentially symmetrical with respect to a centre line in the longitudinal direction of the deep-frying pan and has proved to be effective in preventing from sticking together such products as would otherwise easily come to do so when fried.

In order to impart a sufficient velocity of flow to the oil jets directed against one another essentially transversely of the longitudinal direction of the deep-frying pan, the third collection pipe may be connected to the circulation pump via a pressure-increasing pump.

A preferred velocity of flow for the oil jets directed transversely of the longitudinal direction of the deep-frying pan is in the range of 5–20 m/s, preferably in the range of 8–15 m/s, and most preferred in the range of 10–14 m/s, while at the same time the velocity of flow of the frying oil flowing in the longitudinal direction of the deep-frying pan suitably is in the range of 0.05–0.5 m/s, preferably in the range of 0.1–0.3 m/s, and most preferred in the range of 0.15–0.25 m/s.

In order to prevent even more effectively the products to be fried from sticking together, the oil jets having the higher velocity of flow may be given another temperature than the frying oil flowing in the longitudinal direction in the deep-frying pan, suitably a lower temperature. According to the invention, this is achieved by the pressure-increasing pump being connected to the circulation pump either directly only or both directly and via the heat exchanger. However, the pressure-increasing pump may also be connected to the circulation pump via the heat exchanger only, in which case there will be no substantial difference in temperature between the oil jets having the higher velocity of flow and the frying oil flowing in the longitudinal direction of the deep-frying pan.

Advantageously, the deep-frying pan may have a lower-level bottom portion in the area within which are arranged the lateral inlets, thereby to facilitate the creation of the turbulence that the oil jets having the higher velocity of flow are intended to achieve. The lateral inlets may in particular be arranged on a level with or below the bottom level of the deep-frying pan outside the lower-level bottom portion.

In order that the lateral inlets should not prevent the fried products from moving in the longitudinal direction of the deep-frying pan, the lateral inlets may advantageously be arranged in recesses in the side walls of the deep-frying pan.

BRIEF DESCRIPTION OF THE DRAWINGS

The invention will now be described in more detail with reference to the accompanying drawings, in which.

DETAILED DESCRIPTION OF THE PREFERRED EMBODIMENT(S) OF THE INVENTION

Figure 1:
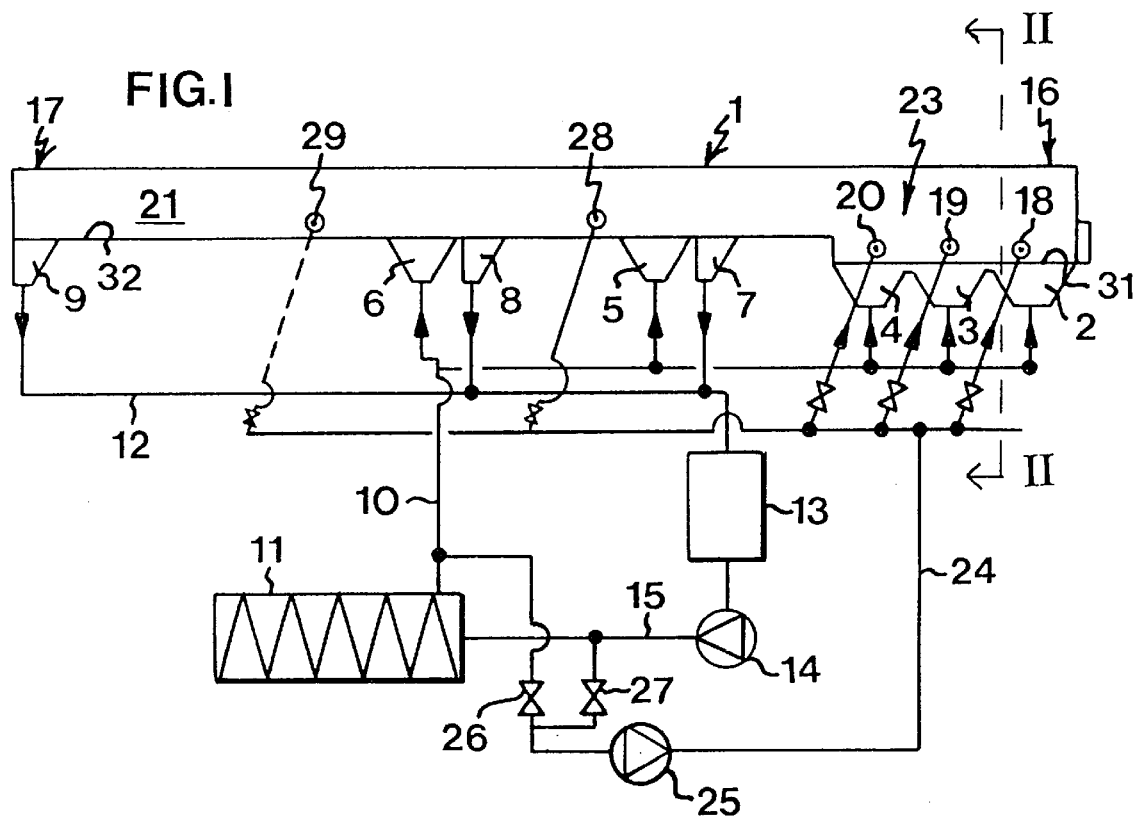
FIG. 1 is a skeleton diagram illustrating one embodiment of the deep-frying apparatus according to the invention.

The illustrated deep-frying apparatus comprises an elongate deep-frying pan 1 having a plurality of bottom inlets 2–6 and a plurality of bottom outlets 7–9 for the frying oil. As appears from FIG. 2, the bottom inlet 3 extends over the entire width of the deep-frying pan 1, and this is the case for the other bottom inlets 2, 4–6 also, as well as for the bottom outlets 7–9.

The bottom inlets 2–6 are connected to a common collection pipe 10, which in turn is connected to the outlet of a heat exchanger 11. Similarly, the bottom outlets 7–9 are connected to a common collection pipe 12, which in turn is connected to the inlet of a filter 13. Via a circulation pump 14 and a conduit 15, the outlet of the filter 13 is connected to the inlet of the heat exchanger 11.

When the circulation pump 14 operates and the deep-frying apparatus is filled with frying oil, the latter is caused to flow in the longitudinal direction of the deep-frying pan from an inlet end 16 towards an outlet end 17 for the products to be fried. These products are displaced primarily with the aid of the frying oil flowing in the longitudinal direction of the deep-frying pan, but special conveying means of a type known per se may also be provided in order to compulsively entrain the fried products from the inlet end to the outlet end. Some sort of conveyor may also in a manner known per se be provided at the outlet end in order to lift and discharge the fried products from the frying-oil bath in the deep-frying pan 1.

In the illustrated deep-frying apparatus, there are further provided, in accordance with the invention, three pairs 18, 19, 20 of opposing lateral inlets arranged in opposing side walls 21, 22 of the deep-frying pan. These lateral inlets 18–20 are arranged in pairs opposite to one another in a direction transverse to the longitudinal direction of the deep-frying pan 1. The lateral inlets 18–20 are further provided in an area 23 of the deep-frying pan that is closest to the inlet end 16. Preferably, this area 23 has an extension in the longitudinal direction of the deep-frying pan 1 that corresponds to the flowing movement of the frying oil during 5–10 sec.

In the illustrated embodiment, the three bottom inlets 2–4 are arranged in the area 23. At least two of these bottom inlets 2–4 are required in order to obtain a suitable flow of frying oil in the longitudinal direction of the deep-frying pan 1, as well as the required temperature of the frying oil where the products to be fried are dropped or fed down into the deep-frying pan 1.

At least one of the pairs 18–20 of lateral inlets is of course required to produce the aimed-at turbulence of the frying oil transversely of the longitudinal direction of the deep-frying pan 1.

The lateral inlets 18–20 are connected to a common collection pipe 24, which in turn is connected to the outlet of a pressure-increasing pump 25, whose inlet is, via valves 26, 27, connected to the collection pipe 10 as well as the conduit 15, i.e. connected to the outlet as well as the inlet of the heat exchanger.

Although this is by no means necessary, additional pairs of lateral inlets 28, 29 may be arranged in the opposing side walls 21, 22 of the deep-frying pan 1 closer to the outlet end 17 than the pairs of lateral inlets 18–20. The additional lateral inlets 28, 29 are usually not required in order to prevent the fried products from sticking together.

Figure 2:
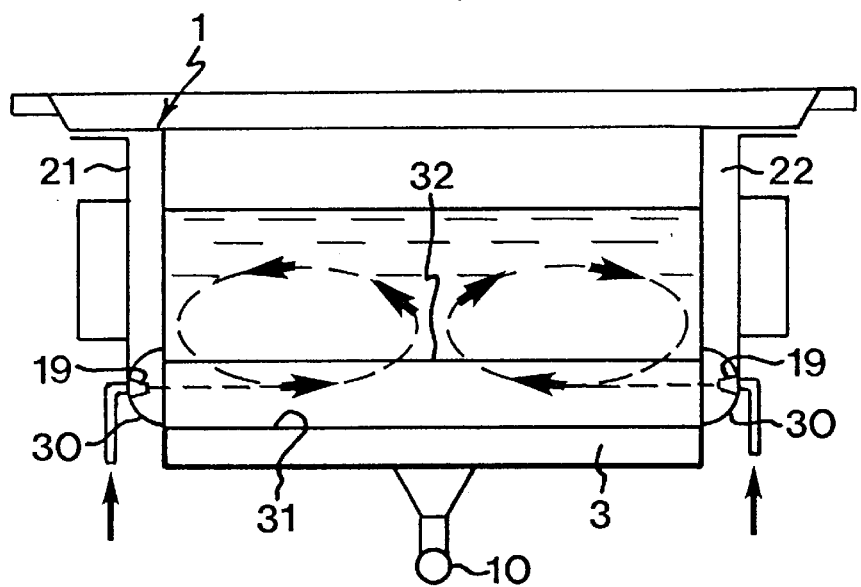
FIG. 2 is a cross-sectional view taken along line II—II in FIG. 1.

Advantageously, the lateral inlets 18–20, 28 and 29 are arranged in recesses in the side walls 21, 22 of the deep-frying pan 1, as is indicated by partially spherical recesses 30 for the lateral inlets 19 in FIG. 2.

In order to produce the aimed-at turbulence symmetrically with respect to a longitudinal center line through the deep-frying pan 1, as hinted at by dashed lines in FIG. 2, the area 23 closest to the inlet end 16 is formed with a lower-level bottom portion 31. In the area 23, the lateral inlets 18–20 are arranged below the bottom level 32 of the deep-frying pan 1 above the lower-level bottom portion 31. The vertical position of the lateral inlets 18–20 may, however, be varied up to the bottom level 32.

By connecting the pressure-increasing pump 25 to the outlet as well as the inlet of the heat exchanger 11, the temperature of the oil jets injected into the deep-frying pan 1 from the lateral inlets 18–20 may be adjusted in the range between the temperature at the inlet of the heat exchanger 11 and the temperature at the outlet thereof, i.e. normally in a range of 25° C., preferably 15° C. and most preferred 10° C., below the temperature at the outlet of the heat exchanger, this temperature optionally being in the range of 115°–190° C., preferably in the range of 120°–180° C., and most preferred in the range of 140°–160° C.

It goes without saying that the above deep-frying apparatus may be modified in many ways within the scope of the invention. Thus, the pressure-increasing pump 25 might be dispensed with in its entirety, the collection pipe 24 being then preferably connected to the outlet of the circulation pump 14, i.e. the conduit 15.

The Invention claimed is:

1. A deep-frying apparatus comprising an elongate deep-frying pan (1) having a plurality of bottom inlets (2–6) and bottom outlets (7–9) for frying oil, each of said bottom inlets and bottom outlets extending substantially over the entire width of the deep-frying pan and which are distributed along the length of the deep-frying pan in order to cause the frying oil to flow in the longitudinal direction of the deep-frying pan from an inlet end (16) towards an outlet end (17) for the products to be deep-fried, a filter (13), a circulation pump (14) and a heat exchanger (11), which are connected in series from a first collection pipe (12), said first collection pipe being connected to the bottom outlets (7–9), to a second collection pipe (10), which is connected to the bottom inlets (2–6), wherein at least one pair (18–20) of opposing lateral inlets is arranged in opposing side walls (21, 22) of the deep-frying pan (1) and disposed opposite to one another in an area closest to the inlet end (16), at least two of the bottom inlets (2–6) being provided in said area, the lateral inlets (18–20) being connected to the circulation pump (14) by a third collection pipe (24), such that oil jets having a velocity of flow exceeding that of the frying oil flowing in the longitudinal direction of the deep-frying pan are directed towards one another essentially transversely of said longitudinal direction.

2. A deep-frying apparatus as set forth in claim 1, wherein the third collection pipe (24) is connected to the circulation pump (14) through a pressure-increasing pump (25).

3. A deep-frying apparatus as set forth in claim 2, wherein the pressure-increasing pump (25) is connected to the circulation pump (14) directly and through the heat exchanger (11).

4. A deep-frying apparatus as set forth in claim 2, wherein the pressure-increasing pump (25) imparts to the oil jets from the lateral inlets (18–20) a velocity of flow of 5–20 m/s, while at the same time the circulation pump (14) imparts to the frying oil a velocity of flow of 0.05–0.5 m/s in the longitudinal direction of the deep-frying pan (1).

5. A deep-frying apparatus as set forth in claim 2, at a suction side, the pressure-increasing pump (25) is also connected to an inlet side of the heat exchanger (11), thereby giving the oil jets from the lateral inlets (18–20) a temperature which at most is 25° C. lower than that at an outlet side of the heat exchanger.

6. A deep-frying apparatus as set forth in claim 1, wherein an area (23) within which the lateral inlets (18–20) are arranged has an extension in the longitudinal direction of the deep-frying pan (1) that corresponds to the flowing movement of the frying oil during 5–10 sec.

7. A deep-frying apparatus as set forth in claim 1, wherein the deep-frying pan (1) has a first level bottom portion (31) in the area (23) within which the lateral inlets (18–20) are arranged said first level bottom portion being lower than a second bottom portion of the deep-frying outside the area (23).

8. A deep-frying apparatus as set forth in claim 7, wherein the lateral inlets (18–20) are arranged on a level with or below the second bottom level (32) of the deep-frying pan (1) outside the first level bottom portion (31).

9. A deep-frying apparatus as set forth in claim 1, wherein the lateral inlets (18–20) are arranged in recesses (30) in the side walls (21, 22) of the deep-frying pan (1).

10. A deep-frying apparatus as set forth in claim 1, wherein the heat exchanger (11) imparts a temperature of 115°–190° C. to the frying oil in the deep-frying pan (1).

* * * * *